(12) United States Patent
Anga

(10) Patent No.: US 8,973,518 B2
(45) Date of Patent: Mar. 10, 2015

(54) HANGING POT WATER INDICATOR

(76) Inventor: John Anga, Toronto (CA)

( * ) Notice: Subject to any disclaimer, the term of this patent is extended or adjusted under 35 U.S.C. 154(b) by 327 days.

(21) Appl. No.: 13/573,381

(22) Filed: Sep. 13, 2012

(65) Prior Publication Data
US 2014/0069526 A1 Mar. 13, 2014

(51) Int. Cl.
*A01G 27/00* (2006.01)
*A47G 7/04* (2006.01)
*G01G 3/02* (2006.01)

(52) U.S. Cl.
USPC ......... 116/215; 116/DIG. 32; 47/67; 177/232

(58) Field of Classification Search
CPC ... A01K 27/00; A01K 27/003; A01K 27/008; A47G 7/04; A47G 7/044; A47G 7/047; F16K 21/18; G01G 3/02; G01G 3/04; G01G 23/20
USPC ................... 46/67; 73/73; 116/215, DIG. 32; 137/78.3, 403, 406; 177/232, 233, 234; 248/318, 333, 339; D6/556, 557, 558; D11/148; 47/67
See application file for complete search history.

(56) References Cited

U.S. PATENT DOCUMENTS

| | | | | |
|---|---|---|---|---|
| 202,807 | A * | 4/1878 | Forschner | 177/232 |
| 225,020 | A * | 3/1880 | Pettengill | 248/318 |
| 479,718 | A * | 7/1892 | Morgan et al. | 177/232 |
| 1,017,137 | A * | 2/1912 | Chatillon | 177/232 |
| 1,063,242 | A * | 6/1913 | Catucci | 177/169 |
| 2,464,665 | A * | 3/1949 | Anderson | 446/227 |
| 3,085,364 | A | 4/1963 | Chapin | |
| 3,168,797 | A | 2/1965 | Patassy | |
| 3,293,799 | A | 12/1966 | Keller | |
| 3,900,134 | A | 8/1975 | Larson | |
| 4,060,934 | A | 12/1977 | Skaggs | |
| 4,078,625 | A * | 3/1978 | Loeb | 177/233 |
| 4,102,308 | A * | 7/1978 | Kilham | 119/52.3 |
| 4,117,630 | A * | 10/1978 | Kalas | 47/67 |
| 4,216,619 | A * | 8/1980 | Espy | 47/67 |
| 4,454,831 | A * | 6/1984 | Gallo | 116/200 |
| 4,760,666 | A * | 8/1988 | Han | 47/79 |
| 5,315,784 | A * | 5/1994 | Henehan | 47/67 |
| 5,848,494 | A * | 12/1998 | Spelt | 47/67 |

(Continued)

FOREIGN PATENT DOCUMENTS

FR 1428959 A * 2/1966 ............... G01G 3/02

OTHER PUBLICATIONS

Measuring Soil Moisture, USA Internet, 1 page, as printed from the internet on Nov. 5, 2014.

(Continued)

*Primary Examiner* — R. A. Smith

(57) ABSTRACT

A hanging pot water indicator having a hollow tubular spring housing, a dust protector on the upper end of the tubular housing, the dust protector having a fastening collar fitting around the upper end of the tubular housing, a hollow tubular sliding sleeve, having an interior diameter greater than the exterior diameter of the tubular housing, and being telescopically slidable in respect thereof, a lower flared portion on the lower end of the sleeve, an opening in the dust protector, a coiled extension spring within the tubular housing and the sleeve, an upper wire extension portion extending from the upper end of the spring passing through the opening in the dust protector, and defining an upper hook, and a lower wire extension extending from the lower end of the spring, and formed to define a hook.

5 Claims, 5 Drawing Sheets

(56) References Cited

U.S. PATENT DOCUMENTS

| | | | | |
|---|---|---|---|---|
| 6,161,329 | A * | 12/2000 | Spelt | 47/67 |
| 6,230,436 | B1 * | 5/2001 | Givens | 47/29.5 |
| 6,564,509 | B1 * | 5/2003 | Zahner | 47/67 |
| 6,845,588 | B2 * | 1/2005 | Muxlow | 47/67 |
| 7,129,426 | B1 * | 10/2006 | Wang | 177/173 |
| 7,219,468 | B1 * | 5/2007 | Muxlow | 47/67 |
| 7,611,116 | B2 * | 11/2009 | Santa Cruz et al. | 248/328 |
| D703,070 | S * | 4/2014 | Anga | D10/56 |

OTHER PUBLICATIONS

A Better Way to Check Soil Moisture USA Internet, 1 page, as printed from the internet on Nov. 5, 2014.

Various Plant Care Devices USA Internet, 7 pages, as printed from Amazon's website on Nov. 5, 2014.

* cited by examiner

HANGING POT WATER INDICATOR

FIELD OF THE INVENTION

The Invention relates to a plant care device for indicating the water status of a potted plant.

BACKGROUND OF THE INVENTION

The care of potted plants requires regular watering in appropriate amounts. Plants that are left to dry will die. Plants that receive excessive water will also die. Where a potted plant is placed at ground level or waist level, then it is possible for a knowledgeable person to regulate the watering of individual pots. However, in many cases persons will wish to hang the pots at or above head level typically on the porch of a house or the balcony of an apartment or such locations. When this happens, the care person, no matter how knowledgeable will have great difficulty in determining the water status of a pot. Feeling the earth in the pot with a hand is not always possible, and is uncertain as to its reliability. Watering such pots at regular schedules is also not acceptable. Some plants require more water and others less.

Accordingly it is desirable to provide a plant care device by means of which an owner or plant care person can determine the water status of a particular pot, and replenish water or not, as the case may be. In the past, devices have been proposed which attempt to measure the water content of the soil. However these devices are relatively expensive, and may not always be reliable. In addition, if such a device is embedded in the soil in a pot, which is hanging at a considerable height, it is not possible to see the reading of the device.

Accordingly, there is a need for a much simpler system for determining the water status of a potted plant, visually, from a distance.

In addition it is desirable that such a device shall be relatively inexpensive, and can be reused over and over again, and does not require any sophisticated technology. Preferably one device will be used with each pot, and left in position throughout the life of the plant.

BRIEF SUMMARY OF THE INVENTION

With a view to providing a plant care device indicating the water status of a potted plant, the invention provides a hanging pot water indicator having a hollow tubular spring housing, typically made of thermo plastic, a dust protector on the upper end of the tubular housing, the dust protector having a fastening collar fitting around the upper end of the tubular housing, a hollow tubular sliding sleeve, having an interior diameter greater than the exterior diameter of the tubular housing, and being telescopically slidable in respect thereof, a lower flared portion on the lower end of the sleeve, an opening in the dust protector, a coiled extension spring within the tubular housing and the sleeve, an upper wire extension portion extending from the upper end of the spring passing through the opening in the dust protector, and defining an upper hook, a lower wire extension extending from the lower end of the spring, and formed to define a hook.

Preferably the invention provides retention means located between the collar on the dust protector and the upper end of the tubular spring housing retaining the spring housing upper end in the collar, and engagement means at the lower end of the sleeve, engaging the lower end of the spring.

Preferably, the dust protector will be formed with a mushroom shape to shed dust.

Preferably, the lower end of the spring will be formed with a outwardly flared spiral portion.

Preferably there will be some visible indicia formed on the tubular spring housing.

In another embodiment, the indicator may be adapted to operate a remote indication of the water status of each plant pot in the system.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

The invention is illustrated in the form of a hanging pot water indicator (10). Such a hanging pot water indicator (10) has utility in suspending a flower pot above the ground, usually at an elevation where the interior of the flower pot is not visible or accessible to a plant care person. Typically there will be one indicator per pot and it will be left in place for the life of the plant.

Figure 2:
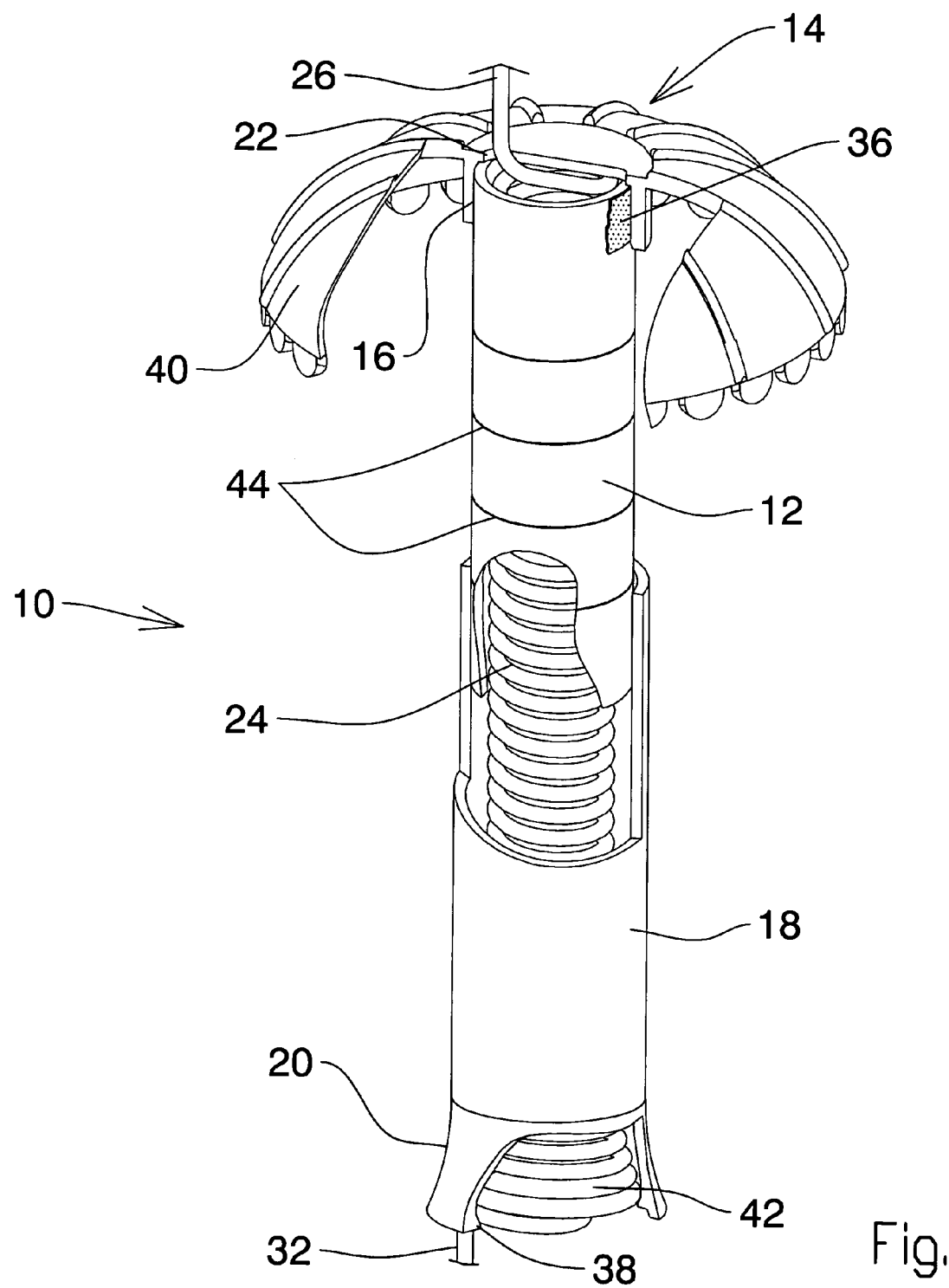
FIG. 2 is a greatly enlarged perspective illustration partly exploded and cut away, of the hanging pot water indicator of FIG. 1.

The hanging pot water indicator (10) has a hollow tubular spring housing (12), typically made of thermo plastic, and a dust protector (14) secured directly on and closing the upper end of the tubular housing as shown in FIG. 2. The dust protector is formed with an integral one piece fastening collar (16) bonded to the upper end of the tubular housing (12).

The hanger further comprises a hollow tubular sliding sleeve (18), having an interior diameter greater than the exterior diameter of the tubular housing (12), and being telescopically slidable in respect thereof. Sleeve (18) has a lower trumpet portion (20) on the lower end of the sleeve.

There is an opening (22) in the dust protector (14).

A coiled extension spring (24) is located within the tubular housing (12) and the sleeve (18). The spring (24) has an upper wire extension portion (26) extending from the upper end of the spring (24) passing through the opening (22) in the dust protector (14) and defining an upper hook (30). A lower wire extension (32) extends from the lower end of the spring (24), and is formed to define a hook (34).

Retention means (36) such as adhesive, are located between the collar (16) on the dust protector (14) and the upper end of the tubular spring housing (12) retaining the spring housing upper end in the collar (16).

Engagement means (38) are located at the lower end of the trumpet portion (20) of the sleeve (18), such as a tab, engage the lower end of the spring (24).

The dust protector (14) is formed with an umbrella or mushroom shaped shell (40) which sheds dust and acts as a dust protector to prevent entry of foreign matter between the housing (12) and the sleeve (18). The lower end of the spring is formed with an outwardly flared spiral portion (42).

Visible indicia (44) are formed on the tubular spring housing (12)

In use, the hanging pot water indicator is first of all attached to a hook at an elevation. The plant pot is then attached to the lower hook (34) of the hanging pot water indicator. The tab (38) engages the lower end of the spring (24). As the spring (24) is extended, it will draw the sleeve (18) down.

Assuming that the watering status of the plant at that time is adequate, then it will cause extension of the spring (24) and the sleeve (18) relative to the housing (12). As the water content of the pot dries out, the pot will gradually be drawn upwardly by the spring. The spiral flared portion (42) of the spring (24) engages the trumpet portion (20) of the sleeve (18) and forces it upwardly.

Visual observation of the position of the sleeve (18) relative to the housing (12) will give adequate indication of the water status of that plant in that pot, and then water can be added, or the pot can be left unattended according to the observations made.

While the above noted and described hanging pot water indicator will perform satisfactorily domestic or even office environments where a few hanging plants are provided for decoration, it will be appreciated that the invention is of water application in the field of commercial horticultural establishments such as commercial greenhouses and flower growing farms.

In these cases, large numbers of hanging flower pots will be either growing, or available in inventory, for example in a retail establishment. In these cases, it will be desirable to provide for automatic watering of the plants as and when required.

Figure 1:
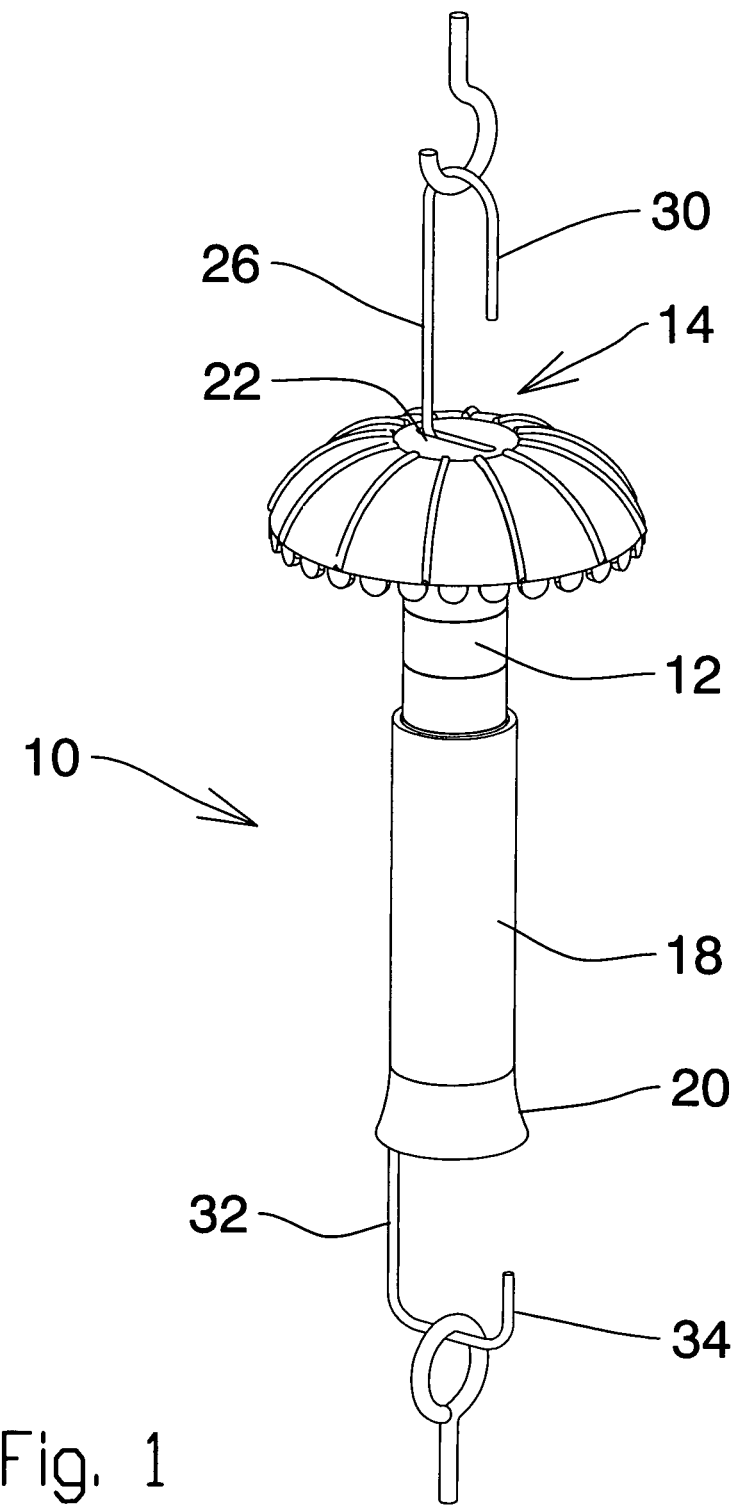
FIG. 1 is a general perspective illustration showing a hanging pot water indicator illustrating the invention, hanging from a fixed location and supporting a potted plant.
Figure 3:
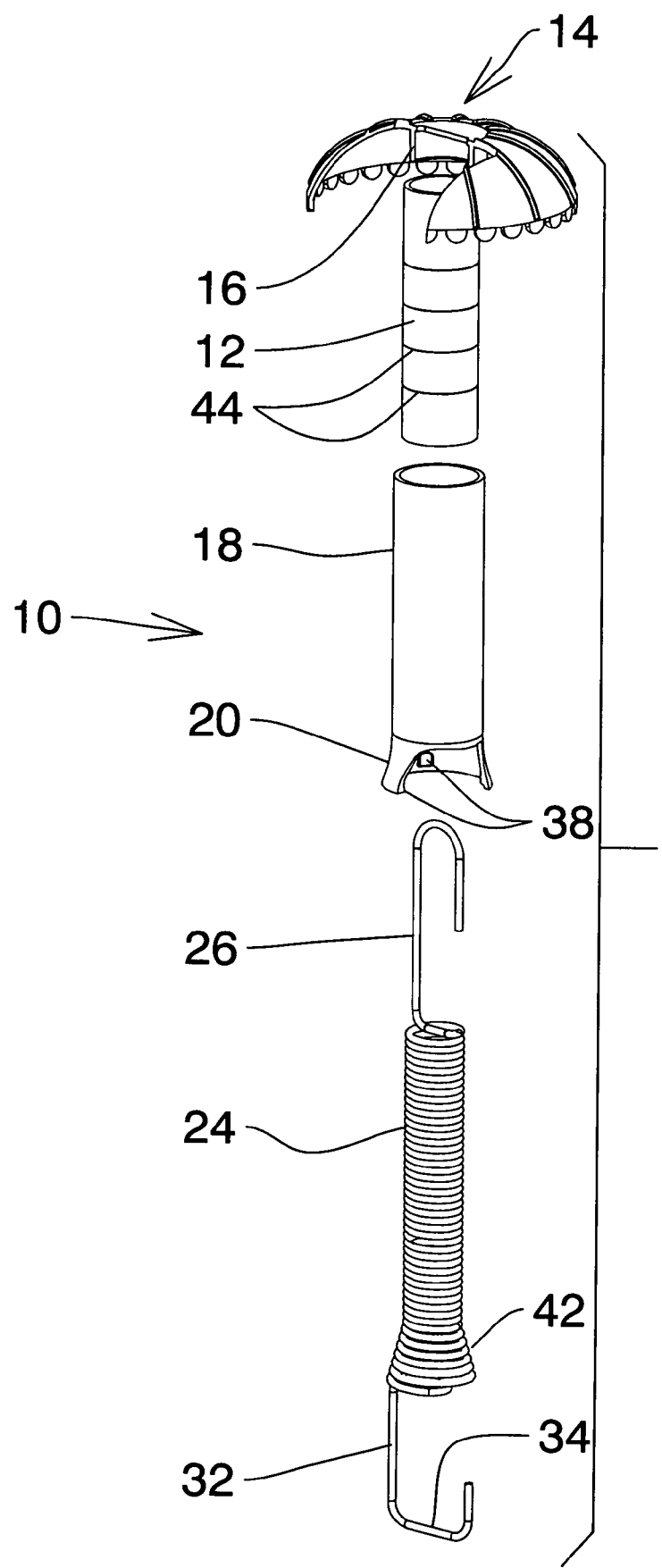
FIG. 3 is an exploded view of the hanging pot water indicator of FIGS. 1 and 2, partially cut away.
Figure 4:
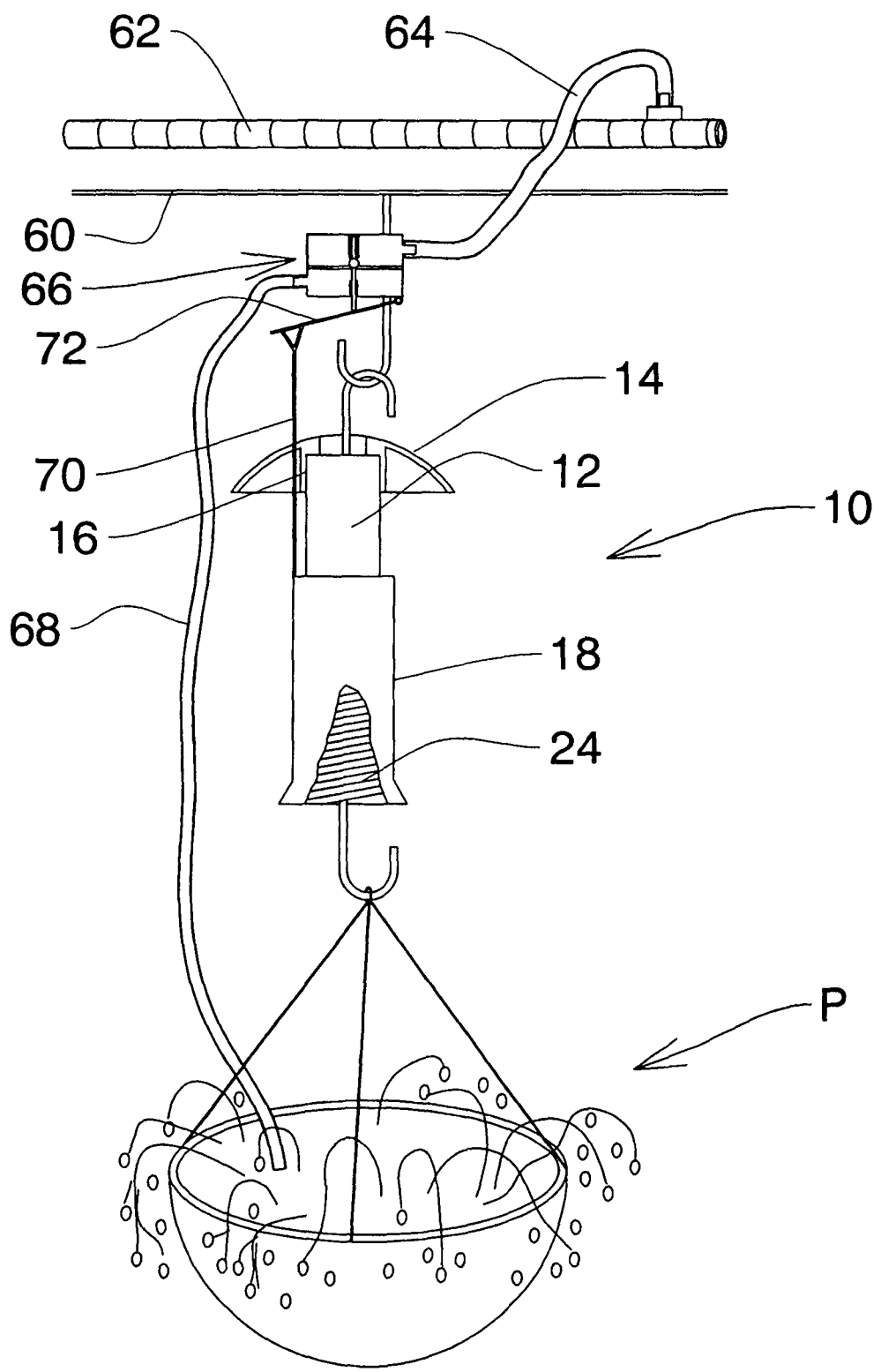
FIG. 4 is a schematic side view of an alternate embodiment.
Figure 5:
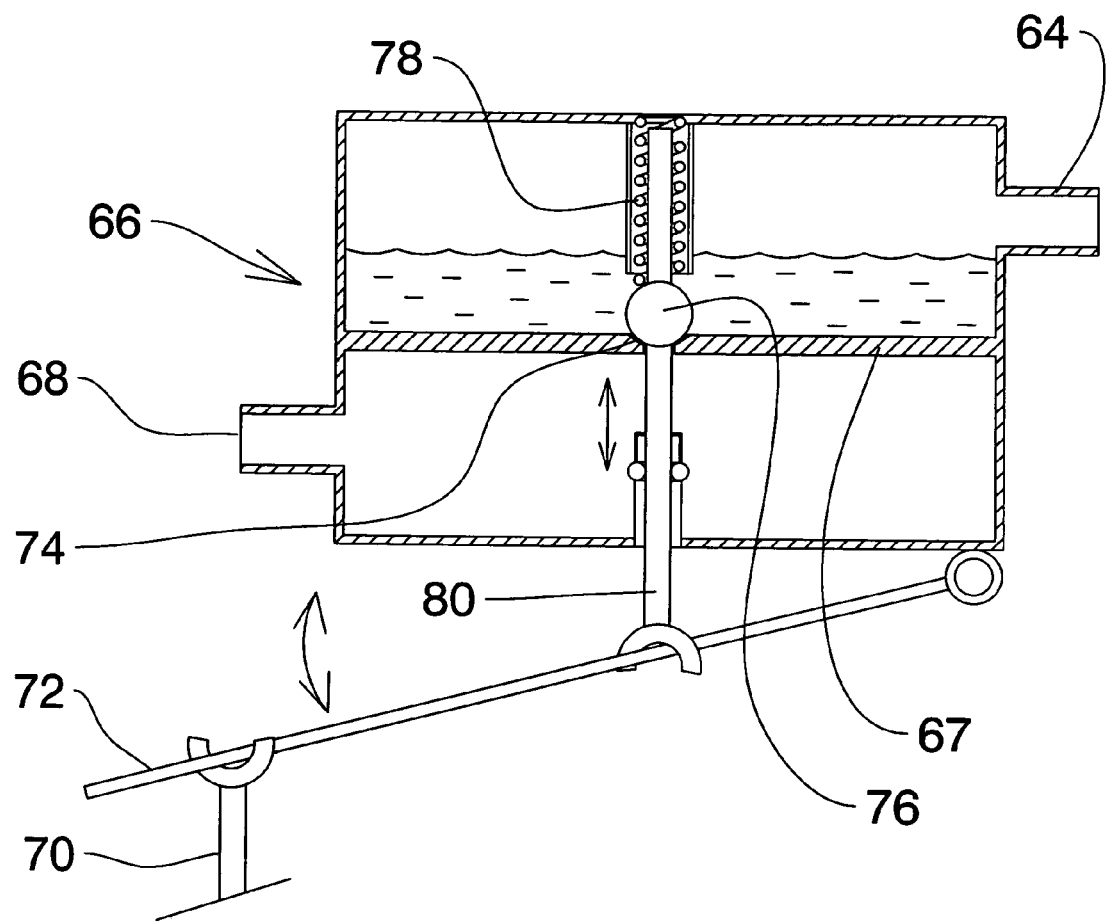
FIG. 5 is a sectional view of a portion of FIG. 4.

This can be accommodated by means of the further embodiment as shown in FIGS. 4 and 5. In this case, a flower pot (P), is illustrated hanging from a hanging pot water indicator (10) of the type generally similar to that described in FIGS. 1 to 3. In other words it will have an upper tubular spring housing (12) and a dust collector (14) formed with an integral collar (16) on the upper end of tubular housing (12) and a hollow sliding sleeve (18) and a spring (24). These will function in the same way as described above. That is to say that when the water in the particular pot (P) is adequate, the hanging pot water indicator (10) will be somewhat extended. When the water in the pot (P) becomes insufficient then the hanging pot water indicator will be retracted upwardly.

In this embodiment however, water will be supplied automatically, when the hanging pot water indicator contracts. In this case it is assumed that numerous such pots (P) will be suspended from a rail (60) typically in a greenhouse or commercial establishments or for example, in a retail establishment. A transverse water supply pipe (62) is connected by means of a supply hose (64) to a valve (66). From the valve (66) water will be allowed to trickle down pipe (68) into the pot (P).

In this case, the hanging pot water indicator (10) has an operating rod (70) attached to the sleeve (18) (FIG. 4). The valve (66) has a lever arm (72) which is connected to the operating rod (70). A wall (67) divides valve (66) into the upper and lower portions. The water supply pipe (64) connects with the upper portion. A valve seat (74), in wall (67) has a closure ball (76), having an internal spring (78) mounted on a valve rod (80). The rod (80) connects with the arm (72)

In this embodiment, the water supply (64) supplies water to the upper portion of the valve (66). The ball (76) normally closes seat (74) in the wall (67), thus preventing passage of the water downwardly into the lower portion. However when the lever arm (72) pushes the rod (80) upwardly against the spring (78), the ball (76) will lift off its seat, and water will thus flow downwardly from the upper portion to the lower portion of valve (66) and thereby flow outwardly to the outlet pipe (68) down into the pot. When sufficient water has flowed into the pot to cause hanging pot water indicator to become extended once again, the operating rod (70) will be retracted and the ball (76) will then once again seat in its opening in the wall, thereby preventing further flow of water.

It will be seen that all of this takes place in a simple and economical structure. In particular it is noteworthy that once set up in this way with the hanging pot water indicator adjusted to allow the correct amount of water, water will be supplied automatically to the various pots as needed, individually. All of this will happen with each hanging pot being controlled and supplied with water at its own rate, and without reference to the other hanging water pots where plants of other species may require more or less water or more or less frequent supplies of water.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A hanging pot water indicator for showing the water status of a hanging plant and comprising;
    a hollow tubular spring housing defining an upper and a lower end and an exterior diameter;
    a dust protector secured directly on and closing said upper end of said tubular housing;
    a fastening collar formed integrally with said dust protector fitting around and bonded to said upper end of said tubular housing;
    a hollow tubular sliding sleeve, having an interior diameter greater than said exterior diameter of the tubular housing, and being telescopically slidable in respect thereof, and defining a sleeve upper end and a sleeve lower end;
    an opening in the dust protector;
    a coiled extension spring within the tubular housing and the sleeve and defining a spring upper end and a spring lower end;
    an upper wire extension portion of said spring extending from the upper end of the spring passing through the opening in the dust protector, and defining an upper hook,
    a lower wire extension of said spring extending from the lower end of the spring, and from the lower end of said sleeve, and formed to define a hook; and,
    catch means on said lower end of said sleeve engaging said spring, whereby extension movement of said spring is communicated to said sleeve as a downward movement of said sleeve relative to said housing and retraction of said spring causes upward movement of said sleeve relative to said housing, thereby giving a visual indication of the water status of the hanging plant.

2. The hanging pot water indicator as claimed in claim 1 and including adhesive located between the collar on the dust protector and the upper end of the tubular spring housing bonding the spring housing upper end in the collar.

3. The hanging pot water indicator as claimed in claim 2, including a trumpet portion at the lower end of the sleeve and a flared lower end portion on the spring received in the trumpet portion of the sleeve.

4. The hanging pot water indicator as claimed in claim 3, wherein said catch means is formed in said trumpet portion engaging said spring.

5. The hanging pot water indicator as claimed in claim 1 for use with a main water supply and including a control valve connected to said supply and controlling water flow, an operating rod on said housing operating said control valve, and a main water supply hose connected to said valve supplying water to said pot.

* * * * *